(12) United States Patent
Islam et al.

(10) Patent No.: US 8,966,995 B2
(45) Date of Patent: Mar. 3, 2015

(54) FLOW METER

(71) Applicant: Spirax-Sarco Limited, Gloucestershire (GB)

(72) Inventors: Nashtara Islam, Gloucestershire (GB); Ben Frisby, Gloucestershire (GB); Grant Needham, Gloucestershire (GB)

(73) Assignee: Spirax-Sarco Limited, Cheltenham, Gloucestershire (GB)

( * ) Notice: Subject to any disclaimer, the term of this patent is extended or adjusted under 35 U.S.C. 154(b) by 161 days.

(21) Appl. No.: 13/760,495

(22) Filed: Feb. 6, 2013

(65) Prior Publication Data

US 2013/0228020 A1    Sep. 5, 2013

(30) Foreign Application Priority Data

Mar. 5, 2012    (GB) .................................. 1203825.3

(51) Int. Cl.
 *G01F 1/28*    (2006.01)
(52) U.S. Cl.
 CPC ........................................ *G01F 1/28* (2013.01)
 USPC ...................................... 73/861.71; 73/861.75
(58) Field of Classification Search
 USPC ................ 73/861.71, 861.74, 861.76, 861.75
 See application file for complete search history.

(56) References Cited

U.S. PATENT DOCUMENTS

| | | | |
|---|---|---|---|
| 3,530,714 A | 9/1970 | Akeley | |
| 4,788,869 A | 12/1988 | Li | |
| 5,554,805 A * | 9/1996 | Bahrton | 73/202 |
| 5,814,738 A * | 9/1998 | Pinkerton et al. | 73/861.55 |
| 5,861,561 A * | 1/1999 | Van Cleve et al. | 73/861.52 |
| 6,352,001 B1 * | 3/2002 | Wickert et al. | 73/861.52 |
| 7,337,678 B2 * | 3/2008 | Thakre et al. | 73/861.52 |
| 7,461,537 B2 * | 12/2008 | Bierl et al. | 73/1.26 |
| 7,832,283 B2 * | 11/2010 | Peters et al. | 73/861.52 |
| 7,878,980 B2 * | 2/2011 | Ricciardelli | 600/533 |

FOREIGN PATENT DOCUMENTS

| | | |
|---|---|---|
| CN | 101603846 | 12/2009 |
| GB | 2463049 | 3/2010 |
| JP | 04148825 | 5/1992 |
| WO | 0066979 | 11/2000 |

OTHER PUBLICATIONS

European Patent Application No. 1203825.3; Search Report under Section 17 completed on Jul. 5, 2012 (2 pages).

\* cited by examiner

*Primary Examiner* — Jewel V Thompson

(74) *Attorney, Agent, or Firm* — Banner & Witcoff, Ltd.

(57) ABSTRACT

Disclosed aspects relate to a flow meter comprising a flow target arranged to be disposed in a fluid flow path in a conduit; a beam coupled to the flow target and arranged to extend outside of the conduit; a sensor having a moveable sensor part coupled to the beam at a position which in use is outside of the conduit, and a static sensor part, wherein displacement of the moveable sensor part with respect to the static sensor part generates a signal. In use, fluid flow acting on the flow target causes displacement of the moveable sensor part, thereby generating a signal which is representative of the fluid flow rate.

27 Claims, 9 Drawing Sheets

FLOW METER

CROSS-REFERENCE TO RELATED APPLICATIONS

The present application claims priority to GB 1203825.3 filed on 5 Mar. 2012, which is hereby incorporated by reference in its entirety for any and all purposes.

BACKGROUND

The invention relates to a flow meter comprising a fluid flow target which in use is disposed in a fluid flow path. Such flow meters are typically referred to as target flow meters.

Target flow meters operate on the principle that the drag force acting on a body due to fluid flow is related to the flow rate of the fluid. A previously considered target flow meter comprises a drag plate disposed within a fluid conduit and attached to a support member which extends to the outside of a conduit. The support member is pivotable and the force acting on the support member, causing it to turn it about the fulcrum, is measured. The flow meter is calibrated so that the force measured can be converted to a flow rate. Such a target meter is shown and described in section 3.2.7.3 of British Standard BS 7405.

Whilst such target flow meters are satisfactory for many applications, the reliability and accuracy may not be particularly good, and the resolution at lower flow rates may not as good as at higher flow rates since the force is proportional to the flow rate squared.

It is therefore desirable to provide an improved flow meter.

SUMMARY

According to an aspect of the invention, there is provided a flow meter comprising: a flow target arranged to be disposed in a fluid flow path in a conduit; a beam coupled to the flow target and arranged to extend outside of the conduit; a sensor having a moveable sensor part coupled to the beam at a position which in use is outside of the conduit, and a static sensor part, wherein displacement of the moveable sensor part with respect to the static sensor part generates a signal; wherein in use, fluid flow acting on the flow target causes displacement of the moveable sensor part, thereby generating a signal which is representative of the fluid flow rate. The flow meter may include a conduit section within which the flow target is disposed and which is arranged to be installed between two pipe sections. The displacement of the moveable sensor part relative to the static sensor part may increase as the fluid flow rate increases.

There may be a plurality of static parts of the sensor. The sensor may be a non-contact sensor. In other words, the moveable sensor part and the static sensor part may not come into contact with each other in use. The sensor may be an inductive sensor.

One of the static sensor part and the moveable sensor part may comprise at least one primary coil and at least one secondary coil, and wherein the other of the static sensor part and the moveable sensor part may comprise a conductor. The primary coil may be provided with an alternating current which induces an induced current in the secondary coil. The induced current may be a function of the displacement of the moveable sensor part. The static sensor part and/or the moveable sensor part may be planar. There may be two planar static sensor plates that are parallel to, and spaced apart from, one another. The moveable sensor part may be disposed between the two static sensor plates and may be planar and substantially parallel to the two static sensor plates. The moveable sensor part may move in a direction substantially perpendicular to its plane in response fluid flow acting of the flow target.

The sensitivity of the sensor may decrease as a function of the displacement of the moveable sensor part. The response of the sensor may be non-linear over at least a part of its range. In use, the sensor may operate at least partly in the non-linear range. This may have the benefit of improving the resolution of the sensor at low flow rates. Whilst the displacement of the moveable sensor part may be directly proportional to the force on the flow target, the force on the flow target may not be directly proportional to the flow rate. For example, the force on the flow target may be proportional to the square of the flow rate. Consequently, the displacement of the moveable sensor part would also be proportional to the square of the flow rate. In this example, the first half of the range of measurable fluid flow rates would correspond to only the first quarter of the range of displacement of the moveable sensor part, meaning that the resolution of the moveable sensor part is lower for low fluid flow rates than for higher fluid flow rates. Decreasing the sensitivity of the sensor as a function of the displacement of the moveable sensor part therefore distributes the resolution of the sensor over the range of measurable fluid flow rates.

The flow meter may further comprise a resilient arrangement coupled to the beam and arranged to be coupled to the conduit. The flow meter may be configured such that in use, fluid flow acting on the flow target causes the flow target to be resiliently angularly displaced. The flow meter may be configured such that in use, fluid flow acting on the flow target causes the moveable sensor part to be resiliently angularly displaced. The flow meter may be configured such that in use, fluid flow acting on the flow target causes the beam to be resiliently angularly displaced.

The flow target, beam and moveable sensor part may be coupled such that they are resiliently angularly displaced in unison in response to fluid flow acting on the target.

The resilient arrangement may comprise a first hollow member arranged to be coupled to the conduit, wherein the beam may be partially disposed within and coupled to the first hollow member. The first hollow member may have a circular cross-section. The first hollow member may have a square or rectangular cross-section. The first hollow member may have an open cross section, for example a C-shaped cross-section. The beam may have a circular cross-section. The beam may have a square or rectangular cross-section. The beam may have an open cross section, for example a C-shaped cross-section.

The first hollow member may be resiliently deformable and in use may bend in response to fluid flow acting on the flow target. The first hollow member may be arranged to extend into the conduit. The first hollow member may be coupled to the beam at a position which in use is inside the conduit. The first hollow member may be coupled to the beam and the flow target at a position which in use is inside the conduit.

The first hollow member and/or the beam may be resiliently biased to a resting position in which they are coaxial with one another. In the resting position, the first hollow member and the beam may be straight (i.e. not bent).

The flow meter may further comprise a ferrule attaching the first hollow member to the beam, wherein the flow target is attached to the ferrule. The flow target may be detachably attached to the ferrule. The ferrule may be configured to provide a rigid connection between the beam and the end of the first hollow member which in use is inside the conduit.

The resilient arrangement may further comprise a second hollow member arranged to extend from the conduit, wherein the first hollow member is partially disposed within and coupled to the second hollow member. The second hollow member may be resiliently deformable and in use may bend in response to fluid flow acting on the flow target.

The first hollow member and the second hollow member and the beam may be resiliently biased to a resting position in which they are coaxial with one another.

The second hollow member may be arranged to extend outside the conduit. The second hollow member may be coupled to the first hollow member at a position which in use is outside the conduit.

The second hollow member may have a circular cross-section. The second hollow member may have a square or rectangular cross-section. The second hollow member may have an open cross section, for example a C-shaped cross-section.

The flow meter may further comprise a spacer disposed between the first and second hollow members, wherein the first and second hollow members are connected to one another by the spacer. The spacer may separate the first and second hollow members such that when they are displaced they do not come into contact.

The invention may comprise any combination of the features and/or limitations referred to herein, except combinations of such features as are mutually exclusive.

BRIEF DESCRIPTION OF THE DRAWINGS

Embodiments of the invention will now be described, by way of example, with reference to the following drawings, in which.

DETAILED DESCRIPTION

Figure 1:
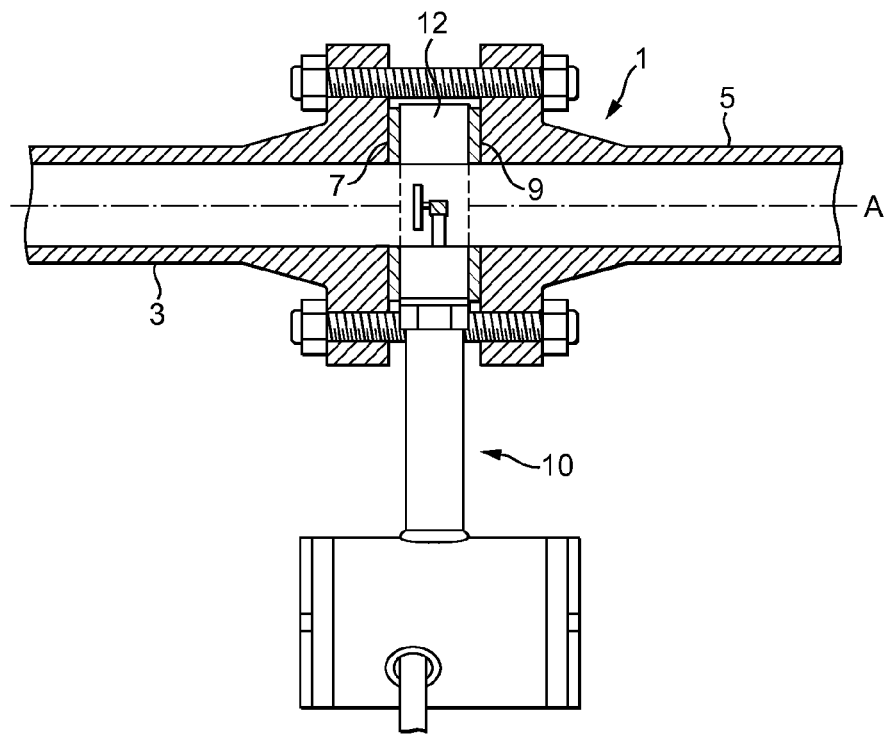
FIG. 1 schematically shows a cross-sectional view of a first embodiment of a flow meter installed in a fluid conduit.

FIG. 1 shows a flow meter 10 comprising an annular conduit section 12 installed in a fluid pipe 1 having an upstream pipe section 3 and a downstream pipe section 5 within which fluid flows. The inner diameter of the conduit section 12 is substantially the same as that of the upstream and downstream pipe sections 3, 5 and the flow meter 10 is installed such that the conduit section 12 is coaxial with the upstream and downstream pipe sections 3, 5. Gaskets (or seals 7, 9) are disposed between the conduit section 12 and the pipe sections 3, 5 and are held together so as to form a tight seal between the conduit section 12 and the pipe sections 3, 5 of the fluid pipe 1. As will be described below, the flow meter 10 is configured to measure the fluid flow velocity within the fluid pipe 1 (and conduit section 12).

Figure 2:
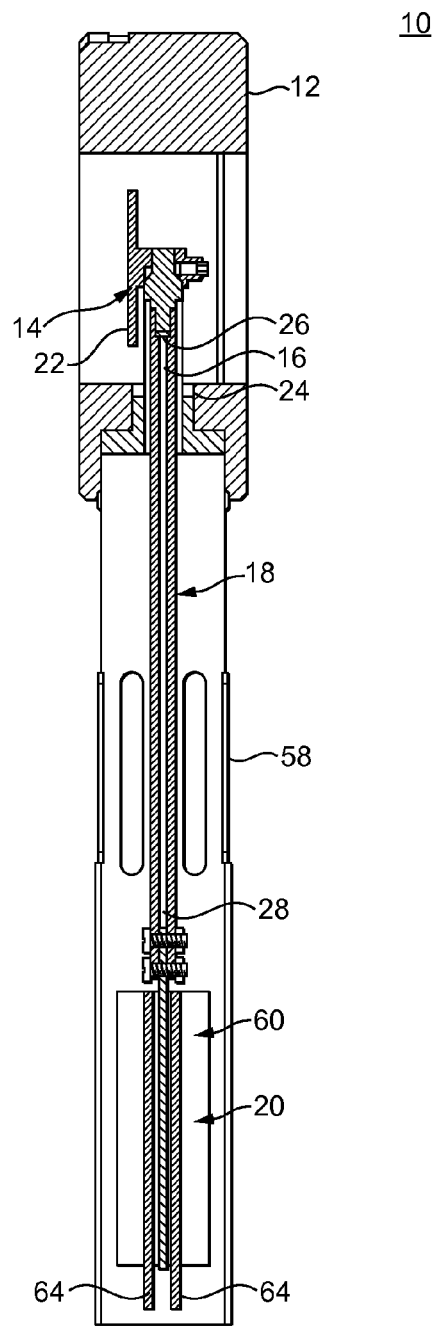
FIG. 2 schematically shows a cross-sectional view of the flow meter of FIG. 1.

With reference to FIG. 2, the flow meter 10 comprises a conduit section 12, a flow target 14 suspended in the conduit section 12 by a beam 16, a resilient arrangement 18 which is configured to bias the flow target 14 to a resting position (shown in FIG. 2) whilst permitting it to be angularly displaced, and a sensor 20 that is configured to detect and measure the deflection of the flow target 14. As will be described in detail below, fluid flow acts on the flow target 14 and causes it to be angularly displaced. This displacement is measured by the sensor 20 which is calibrated to calculate the associated flow rate.

The flow target 14 has a planar circular face 22. The flow target 14 is positioned in the conduit section 12 so that the planar face 22 is coaxial with the conduit section 12 and so that the planar face 22 is perpendicular to the fluid flow direction and faces the flow. The beam 16 is an elongate tube which radially extends from inside the conduit section 12 to outside of the conduit section 12 through a radial through-opening 24. The radially inner end 26 of the beam 16 is attached to the flow target 14 and the radially outer end 28 of the beam 16 is attached to a part of the sensor 20 (as will be described in detail below). The resilient arrangement 18 comprises two concentric tubes which couple the beam 16 to the conduit section 12. The resilient arrangement 18 is attached to both the beam 16, and a mounting plug 30 which is disposed within the opening 24 in the conduit section 12 and is attached thereto. The resilient arrangement 18 and plug 30 allow the beam to extend through the conduit section 12, whilst providing a fluid tight seal. As described above, the resilient arrangement 18 biases the flow target 14 to the resting position in which the planar face 22 is perpendicular to the fluid flow, whilst allowing the flow target 14 to be angularly displaced in response to fluid flow acting on the flow target 14.

Figure 3:
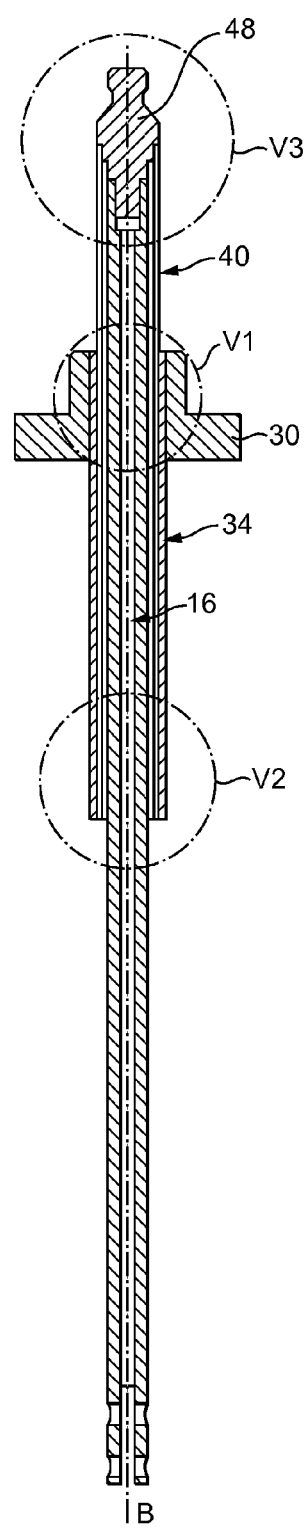
FIG. 3 schematically shows a cross-sectional view of the beam and resilient arrangement of the flow meter of FIG. 2.
Figure 4:
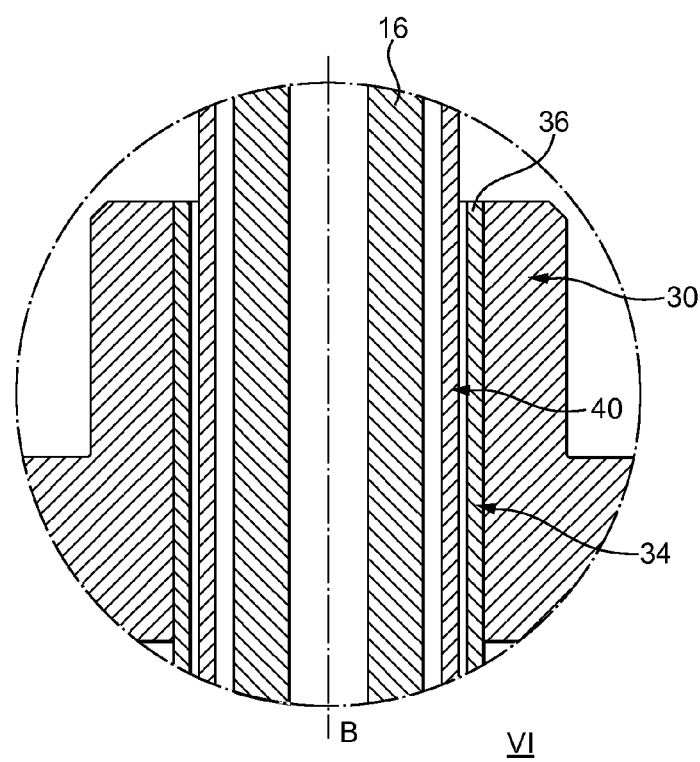
FIG. 4 shows an enlarged view of V1 of FIG. 3.
Figure 5:
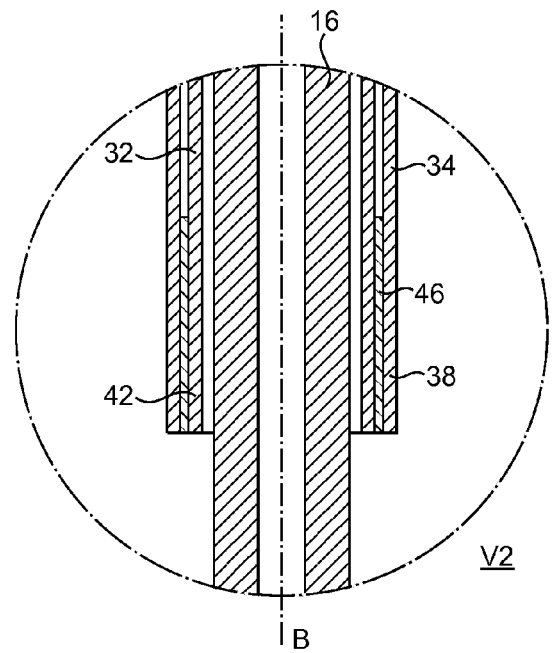
FIG. 5 shows an enlarged view of V2 of FIG. 3.

With reference to FIG. 3, the resilient arrangement 18 comprises a resiliently deformable inner tube 32 and a resiliently deformable outer tube 34 that surrounds a portion of the length of the inner tube 32. As shown in FIG. 4, the radially inner end 36 of the outer tube 34 is disposed within an opening in the mounting plug 30 and is welded thereto. The outer tube 34 radially extends away from the conduit section 12 and terminates at its radially outer end 38. The outer tube 34 is of constant thickness and diameter can bend away from its normal longitudinal axis under load. The resilience of the outer tube 34 is due to its elastic material properties. The resiliently deformable inner tube 32 is disposed within the outer tube 34. As shown in FIG. 5, the radially outer end 42 of the inner tube 32 is attached to the radially outer end 38 of the outer tube 34 by an annular spacer 46 that is disposed between the inner and outer tubes 32, 34. The inner tube 32 radially extends inwardly to the inside of the conduit section 12 and terminates at its radially inner end 44 at a position towards the centre of the conduit section 12. The inner tube 32 is longer than the outer tube 34 and therefore the inner tube 32 extends beyond the outer tube 34. The outer diameter of the inner tube 32 is less than the inner diameter of the outer tube 34, thereby leaving an annular gap between the inner and outer tubes 32, 34. Like the outer tube 34, the inner tube 32 is of constant thickness and diameter and can bend away from its normal longitudinal axis under load. The resilience of the inner tube 32 is due to its elastic material properties.

Figure 6:
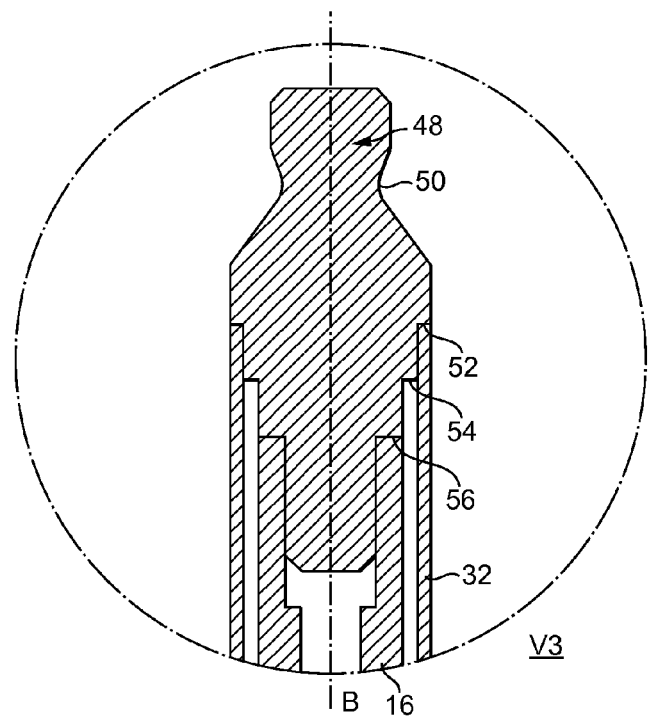
FIG. 6 shows an enlarged view of V3 of FIG. 3.

With reference to FIG. 6, the resilient arrangement 18 is attached to the radially inner end 26 of the beam 16 by a solid ferrule 48, or plug. The ferrule 48 has an axisymmetric outer profile and comprises a target mounting portion 50 at its radially inner end and first, second and third annular shoulders 52, 54, 56 at its radially outer end. The target mounting portion 50 tapers inwardly to form a neck and, as shown in FIG. 2, the flow target 14 is detachably attached to the mounting portion 50. The radially inner end 44 of the inner tube 32 sits on the first (outermost) annular shoulder 52 of the ferrule 48 and is welded thereto, thereby attaching the resilient arrangement 18 to the ferrule 48. The radially inner end 26 of the beam 16 sits on the third (innermost) annular shoulder 56 of the ferrule 48 and is welded thereto, thereby attaching the beam 16 to the ferrule 48. The ferrule 48 therefore acts to attach the beam 16 to the resilient arrangement 18. Specifically, it acts to attach the radially inner end 44 of the inner tube 32 to the radially inner end 26 of the beam 16. The arrangement of the annular shoulders 52, 54, 56 ensures that the longitudinal axis of the ferrule 48 remains coaxial with the inner ends of the beam 16 and inner tube 32. Thus, when the flow target 14 is deflected, the inner tube 32 bends, and the beam 16 remains linear with the axis of the ferrule 48.

The beam 16 extends radially outwardly from the ferrule 48 through the inner tube 32 of the resilient arrangement 18 to the outside of the conduit section 12. The length of the beam 16 is longer than that of the inner tube 32 and therefore extends beyond the resilient arrangement 18. The beam 16 is of constant diameter and thickness, and has an outer diameter less than the inner diameter of the inner tube 32 such that there is an annular gap between the inner tube 32 and the beam 16. In this embodiment, the beam 16 is significantly stiffer than the outer and inner tubes 32, 34 and is substantially rigid.

Referring back to FIG. 2, the flow meter 10 further comprises a stand-off tube 58 which radially extends from the conduit section 12. The portion of the beam 16 extending outside of the conduit section 12 and the sensor 20 are housed within the stand-off tube 58. The stand-off tube 58 also houses the portions of the inner and outer tubes 32, 34 which lie outside of the conduit section 12.

Figure 7:
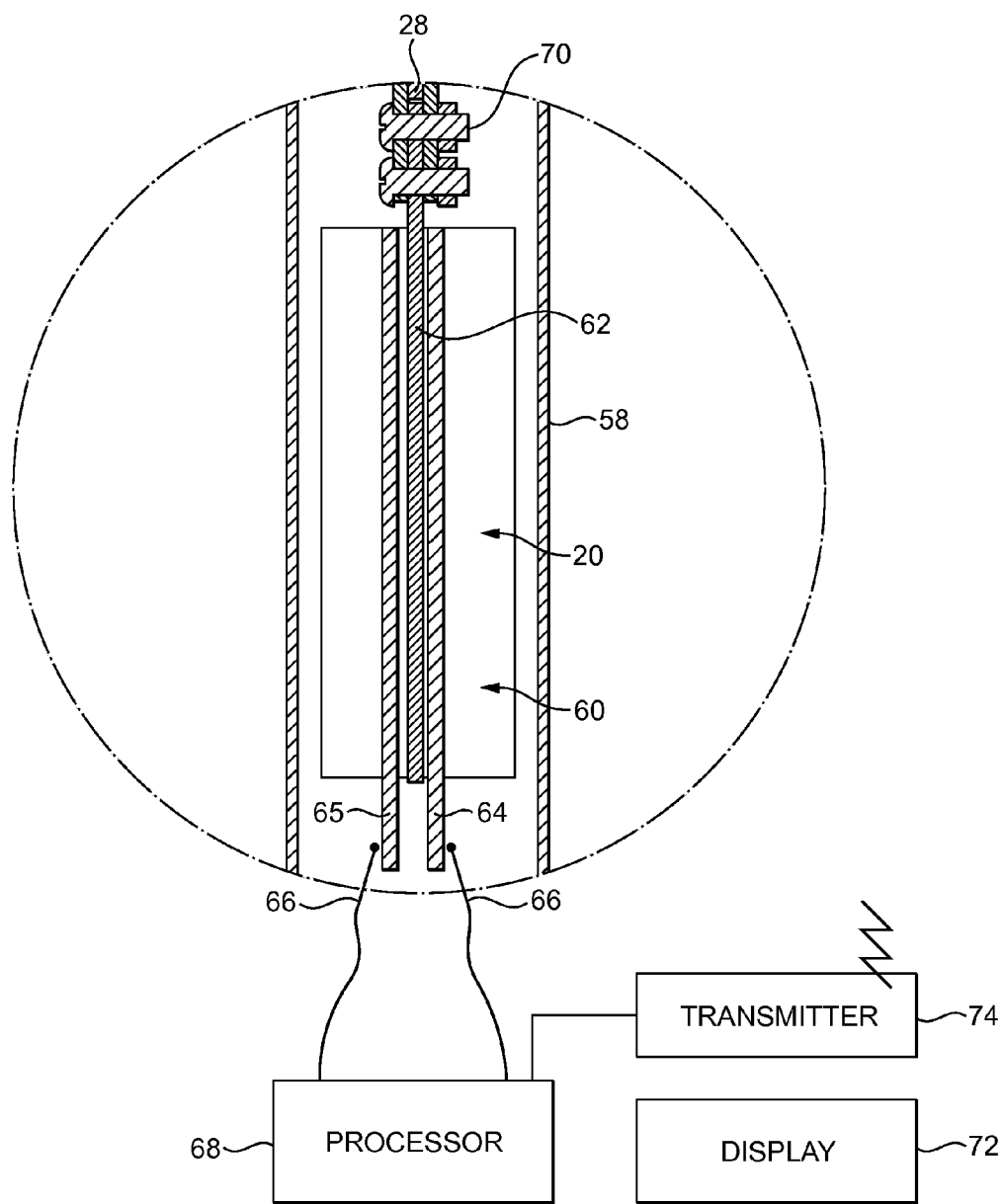
FIG. 7 shows an enlarged view of the sensor of the flow meter of FIG. 2.

As shown in FIG. 7, the sensor 20 is located beyond the radially outer end 28 of the beam 16 and has a static assembly 60 fixedly attached to the stand-off tube 58 and a moveable sensor part 62 attached to the radially outer end 38 of the beam 16. In this embodiment, the sensor 20 is an inductive sensor. The static assembly 60 comprises first and second inductive sensor plates 64, 65 that are rigidly attached to the stand-off tube 58 such that they are spaced from and parallel to one another. Each sensor plate 64, 65 lies in a plane that is parallel to the axis of the stand-off tube 58 (i.e. the radial direction of the conduit section 12). The sensor plates 64, 65 are connected to a controller 68 by connection leads 66. The moveable part 62 is a planar conductive wafer, in the form of a copper plated board, and is rigidly mounted to the radially outer end of the beam 16 such that it extends between, and in the resting position is parallel to, the two static sensor plates 64, 65. In this embodiment, the moveable sensor part 62 is attached to the radially outer end 28 of the beam 16 by two bolts 70. However, it should be appreciated that in other embodiments other methods of attachment may be used.

The controller 68 of the sensor is configured to generate an output signal that is dependent on the position of the moveable sensor part 62 relative to the static sensor plates 64, 65. The controller 68 is also calibrated so that the signal output represents the flow rate in the pipe 1. This may be displayed locally on a display 70, or may be transmitted to a central monitoring station by a transmitter 72, or both.

Figure 8:
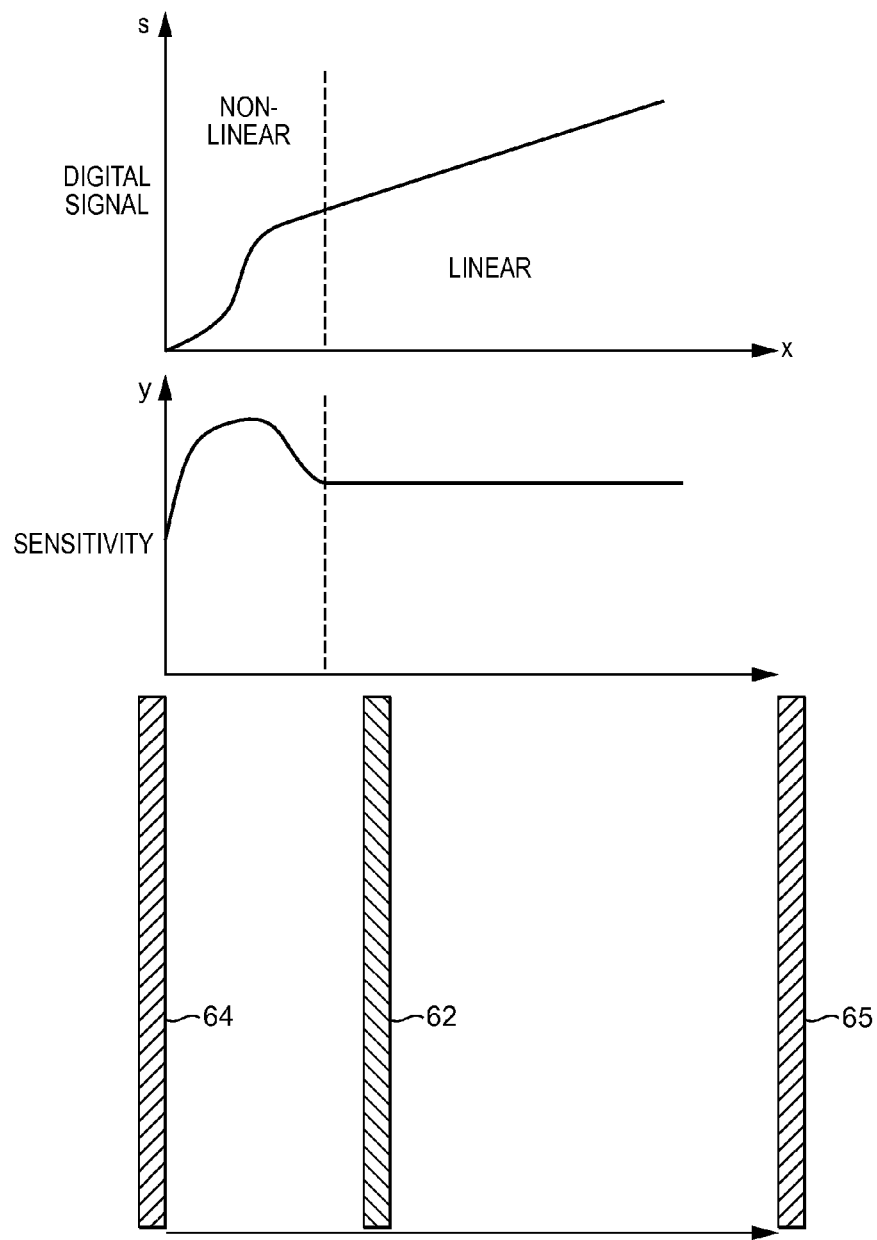
FIG. 8 schematically shows the response and sensitivity of the sensor of the flow meter of FIG. 2.

Each fixed sensor plate 64, 65 comprises a printed circuit board having at least one primary coil and at least one secondary coil provided thereon. In use, the controller 68 provides an AC current to the primary coil of each sensor plate 64, 65 which generates a magnetic field. This magnetic field induces a current in the respective secondary coil and this is fed to the controller 68. The phase difference between the AC current supplied to each primary coil and the induced current in the respective secondary coil is affected by moving the conductive moveable sensor part 62. The controller 68 calculates this phase difference and converts it to a digital value. As can be seen in FIG. 8, the digital value s is a function of the position x of the conductive moveable sensor part 62 between the two sensor plates 64, 65. The inductive sensor has a non-linear response when it is close to one of the sensor plates 64, 65, and an approximate linear response at distances further away from the sensor plates 64, 65. The sensitivity y of the sensor 20 therefore varies with distance x. There may be benefits in operating the sensor in the non-linear range, but there may also be benefits in operating the sensor in the linear range.

In this embodiment the sensor 20 is configured such that in the resting position the conductive moveable sensor part 62 lies closer to the first sensor plates 64 than the second sensor plate 65. The sensor 20 can be configured so that in the resting position the moveable sensor part 62 is located within the linear range of the sensor 20.

Although it has been described that there are two sensor plates 64, 65, it may be possible to use only one of the plates. Further, it may be possible to use two sensor plates 64, 65 and to subtract the phase differences in order to improve the resolution. In other embodiments sensors other than inductive sensors may be used.

The mounting plug 30 serves as a pivot point about which the resilient arrangement 18 and beam 16 can move with respect to the conduit section 12. The deformable or moveable components include the inner and outer tubes 32, 34, the spacer 46, the ferrule 48, the flow target 14, the beam 16 and the moveable sensor part 62. These components are distributed and configured such that they are inertially balanced about the pivot point of the mounting plug 30. Consequently, the dynamic response of the components either side of the mounting plug 30 due to any external dynamic loading to the pipe sections 3, 5 or the conduit section 12 will be equal, thereby preventing any residual deflection and/or movement of these parts following the external loading, and preventing unrepresentative readings from the sensor 20. The sensor 20 will therefore be isolated from vibration of the pipe sections 3, 5 and the conduit section 12 due to external loads.

In use, and with no fluid flow through the pipe 1 (and hence the conduit section 12), there is no fluid flow acting on the flow target 14 and hence no drag force is exerted on the flow target 14. Therefore, the flow target 14, beam 16, resilient arrangement 18 and moveable sensor part 62 are in the resting configuration as shown in FIGS. 2 and 7. The resilient arrangement 18 biases the other components to the resting position in which the planar face 22 of the flow target 14 is perpendicular to the longitudinal axis of the pipe 1, and the beam 16, inner tube 32 and outer tube 34 are coaxial with one another (along a radial line perpendicular to the axis of the pipe 1). As shown in FIG. 7, in the resting position the moveable sensor part 62 is closer to the first static sensor plate 64 than the second static sensor plate 65. In the resting position, the sensor circuitry outputs a signal representative of a zero fluid flow rate.

Figure 9:
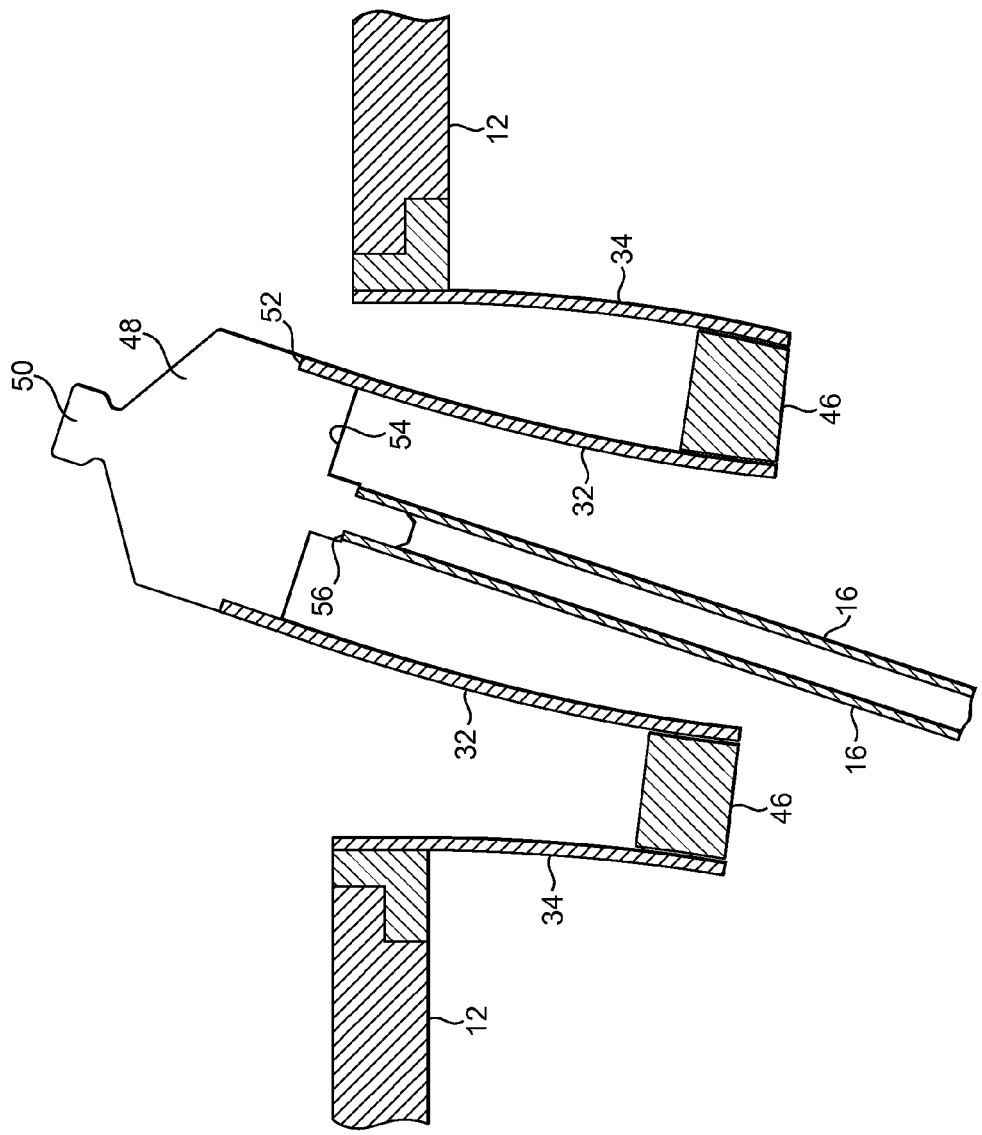
FIG. 9 schematically shows an exaggerated deflection of the beam and resilient arrangement of the flow meter of FIG. 2.

Referring now to FIG. 9, in use, and with fluid flow through the pipe 1 (and hence conduit section 12), the fluid flow acting on the flow target 14 generates a drag force that acts on the flow target 14 and causes the flow target 14 to be resiliently angularly displaced against the resilient force of the resilient arrangement 18. Specifically, the flow target 14, which is attached to the radially inner end 44 of the inner tube 32 by the ferrule 48, causes the inner tube 32 to resiliently bend along its length about its radially outer end 42 (clockwise bending in FIG. 9). The radially outer end 42 of the inner tube 32 is attached to the radially outer end 38 of the outer tube 34 by the spacer 46 and hence the bending of the inner tube 32 causes the outer tube 34 to resiliently bend along its length about its radially inner end 36 (clockwise in FIG. 9) which is fixed with respect to the conduit section 12. The inner tube 32 is cantilevered about its radially outer end 42 which is fixed to the radially outer end 38 of the outer tube 34 and which is angularly displaced in the clockwise direction (in FIG. 9) when fluid flow impacts the target 14. The outer tube 34 is cantilevered about its radially inner end 36 which is fixed to the mounting plug 30 which in turn is fixed to the conduit section 12.

As fluid flow impacts the flow target 14 and causes it to be resiliently angularly displaced, the beam 16 is also resiliently angularly displaced, but remains coaxial with the ferrule 48 and parallel to the planar face 22 of the flow target 14. However, since the beam 16 is only fixed at its radially inner end 26 to the ferrule 48, the beam does not undergo any bending but its radially outer end 28 is angularly displaced in the clockwise direction (in FIG. 9). Since the inner and outer tubes 32, 34 bend upon fluid flow impact on the flow target 14, the beam 16 no longer remains coaxial with either the inner or outer tube 32, 34. The annular gaps between the beam 16 and the inner tube 32 (defined by the ferrule 48) and the inner tube 32 and outer tube 34 (defined by the spacer 46) prevent the beam 16, inner tube 32 and outer tube 34 from coming into contact with one another.

The clockwise angular displacement of the radially outer end 38 of the beam 16, caused by fluid flow impact on the flow target 14, causes the moveable sensor part 62 to also be angularly displaced in the clockwise direction such that it moves with respect to the static sensor assembly 60. The moveable sensor part 62 therefore moves away from the first static sensor plate 64 and moves closer to the second static sensor plate 65. This movement alters the phase difference between the AC current provided to the primary coil and the induced current in the secondary coil. The controller converts this to a digital value, thereby generating a signal representative of the position of the moveable sensor part 62 between the first and second static sensor plates 64, 65. The controller is calibrated to output a flow rate signal that is representative of the flow rate within the pipe 1. As the flow rate increases in the pipe 1, the angular displacement of the flow target 14 increases and hence the angular displacement of the moveable sensor part 62 also increases. The signal output by the controller 68 therefore increases to a value that represents the flow rate within the pipe 1.

The spring constant of the resilient support structure 18 controls the angular displacement of the flow target 14 for a given flow rate (in conjunction with the area of the planar face 22). This, in conjunction with the length of the beam 16, also controls the lateral displacement of the moveable sensor part 62 for the given flow rate. If the spring constant is increased, the displacement is reduced for a given flow rate, and if the spring constant is reduced, the displacement is increased for a given flow rate. Thus, if the range of expected flow rates is known, the lateral displacement range of the moveable sensor part 62 can be controlled by adjusting the spring constant of the resilient support structure 18, the length of the beam 16 and also the area of the planar face 22 of the flow target 14. The spring constant of the resilient support structure 18 is dependent on numerous factors including the length of the inner and outer tubes 32, 34, the thickness of the tube walls, the diameter of the tubes, and the material properties of the tubes.

Whilst the displacement of the flow target 14 is proportional to the flow rate within the pipe 1, it is not directly proportional to the flow rate. Accordingly, the displacement of the moveable sensor part 62 is also proportional, but not directly proportional, to the flow rate.

The drag force F experienced by the flow target 14 is approximately proportional to the square of the velocity flow rate u:

$$F \propto u^2$$

The rate of change of the drag force F with respect to the flow rate u is therefore proportional to 2 u:

$$\frac{dF}{du} \propto 2u$$

Since the angular displacement (and lateral displacement) of the moveable sensor part x is directly proportional to the drag force F (Hooke's Law), the rate of change of angular displacement (or indeed lateral displacement) x of the moveable sensor part 62 is also proportional to 2 u. The rate of change of displacement of the moveable sensor part 62 can be referred to as the sensitivity of the movement of the moveable sensor part 62 to changes in flow velocity:

$$\frac{dx}{du} \propto 2u$$

This means that a flow rate change Δu at a relatively low flow rate causes a smaller displacement of the moveable sensor part Δx than the same flow rate change Δu at a higher flow rate. Accordingly, if the sensor 20 is operated in the linear range in which the output of the sensor 20 is directly proportional to the displacement of the moveable sensor part 62, then the resolution of the flow meter 10 is lower at low flow rates than at high flow rates.

In certain embodiments it may be beneficial to operate the inductive sensor 20 at least partly within the non-linear range in which it has a higher sensitivity at low displacements when compared to high displacements. In other words, a particular displacement change of the moveable sensor part Δx at low displacements (and therefore low flow rates) causes a higher output signal change ΔS than the same displacement change at higher displacements (and therefore higher flow rates). This non-linear response of the sensor 60 helps to provide increased resolution at lower flow rates, and more even resolution across the range of measureable flow rates.

The use of a double tube arrangement 32, 34 for the resilient arrangement 18 allows the spring constant to be closely controlled, hence allowing the movement of the moveable sensor part to be closely controlled, whilst minimising the amount of space required. Further, the number of moving parts is minimised which increases the reliability of the flow meter.

The double tube arrangement 32, 34 also allows the beam 16 to extend outside of the conduit section 12 and therefore the electronic components of the sensor 20 can be located outside of the conduit 12 remote from any adverse temperature or pressure conditions.

The invention allows the movement of the flow target 14 to be translated to the movement of a moveable sensor part disposed outside of the conduit. This movement can be then be detected, as opposed to measuring another parameter such as the strain of the beam. This movement can be detected by a non-contact sensor, such as an inductive sensor, which may be more accurate and may be less susceptible to pressure and temperature effects than strain gauges and other sensors. Further, non-contact sensors may have improved reliability over strain gauges. For example, strain gauges are known to be susceptible to failure of the bonding between the strain gauge and the component to which it is mounted, and are also susceptible to hysteresis effects.

Figure 10:
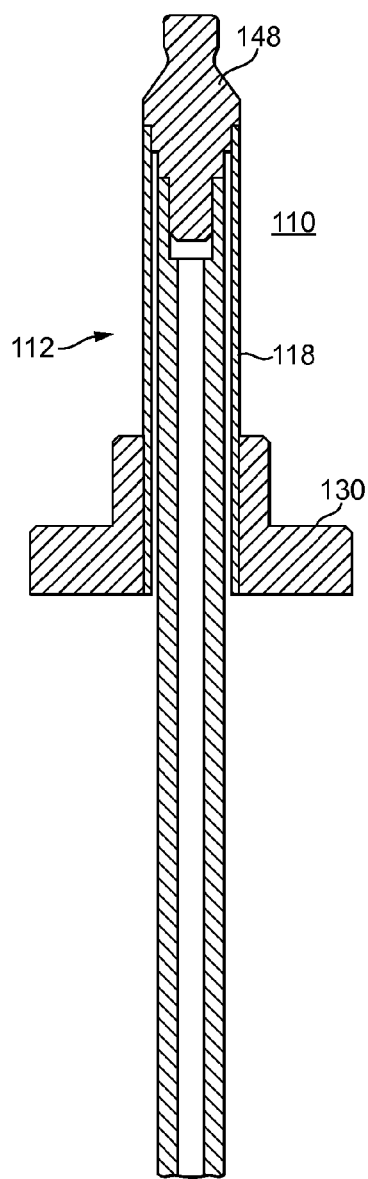
FIG. 10 schematically shows a cross-sectional side view of a second embodiment of a flow meter.

FIG. 10 shows a second embodiment of a flow meter 110 which is similar to that of the first embodiment. However, the resilient arrangement 118 only comprises a single tube which extends from the mounting plug 130 into the conduit section 112 where it is attached to the ferrule 148. The flow meter 110 operates in substantially the same manner.

Although embodiments of the invention have been described in which the beam 16 extends from the ferrule 48 through the resilient arrangement 18 to the outside of the conduit section 12, it should be appreciated that in other embodiments the beam 16 may extend from the ferrule 48 through a separate opening in the diametrically opposite side of the conduit section 12.

Although embodiments of the invention have been described in which the flow target 14 is mounted to a resilient arrangement 18 and coupled to a rigid beam 16, in other embodiments the flow target 14 may be mounted to the end of a resiliently deformable beam 16 cantilevered at a position outside the conduit section 12, with the moveable sensor part 62 being attached to the beam 16. In such an embodiment the beam 16 may extend through a bellows or diaphragm which isolates the fluid flow within the conduit section 12.

Although embodiments of the invention have been described in which the flow target is disposed within the conduit in the main body of the pipe flow, it will be appreciated that in other embodiments the flow meter may be a variable area flow meter having an orifice plate in the conduit and a conical flow target axially displaceable with respect to the orifice plate.

The invention claimed is:

1. A flow meter, comprising:
   a flow target configured to be disposed in a fluid flow path of a conduit;
   a beam coupled to the flow target and configured to extend outside of the conduit;
   a sensor having a moveable sensor part and a static part, wherein the moveable sensor part is coupled to the beam at a position outside of the conduit in a manner such that a fluid flow acting on the flow target causes displacement of the moveable sensor part; and
   wherein the sensor is configured to generate a signal which is representative of a fluid flow rate based upon the displacement of the moveable sensor part with respect to the static sensor part.

2. A flow meter according to claim 1, wherein the sensor is a non-contact sensor.

3. A flow meter according to claim 1, wherein the sensor is an inductive sensor.

4. A flow meter according to claim 3, wherein one of the static sensor part and the moveable sensor part comprises at least one primary coil and at least one secondary coil, and wherein the other of the static sensor part and the moveable sensor part comprises a conductor.

5. A flow meter according to claim 4, wherein the primary coil is configured to be provided with an alternating current which induces an induced current in the secondary coil.

6. A flow meter according to claim 5, wherein the induced current is a function of the displacement of the moveable sensor part.

7. A flow meter according to claim 4, wherein the static sensor part and the moveable sensor part are planar.

8. A flow meter according to claim 1, wherein the sensor is configured to have a sensitivity parameter which decreases as a function of the displacement of the moveable sensor part.

9. A flow meter according to claim 1, wherein the sensor is configured to have a non-linear response over at least a part of its range.

10. A flow meter according to claim 9, wherein the sensor is configured to operate at least partly in the non-linear range.

11. A flow meter according to claim 1, further comprising a resilient arrangement coupled to the beam and configured to be coupled to the conduit.

12. A flow meter according to claim 11, wherein the flow meter is configured to permit fluid flow acting on the flow target to cause the flow target to be resiliently angularly displaced.

13. A flow meter according to claim 11, wherein the flow meter is configured to permit fluid flow acting on the flow target to cause the moveable sensor part to be resiliently angularly displaced.

14. A flow meter according to claim 11, wherein the flow meter is configured to permit fluid flow acting on the flow target causes the beam to be resiliently angularly displaced.

15. A flow meter according to claim 11, wherein the resilient arrangement comprises a first hollow member arranged to be coupled to the conduit and wherein the beam is partially disposed within and coupled to the first hollow member.

16. A flow meter according to claim 15, wherein the first hollow member is resiliently deformable and configured, such that in use, it bends in response to fluid flow acting on the flow target.

17. A flow meter according to claim 15, wherein the first hollow member is arranged to extend into the conduit.

18. A flow meter according to claim 15, wherein the first hollow member is coupled to the beam at a position which in use is inside the conduit.

19. A flow meter according to claim 15, wherein the first hollow member is coupled to the beam and the flow target at a position which in use is inside the conduit.

20. A flow meter according to claim 19, further comprising a ferrule attaching the first hollow member to the beam, wherein the flow target is attached to the ferrule.

21. A flow meter according to claim 20, wherein the flow target is detachably attached to the ferrule.

22. A flow meter according to claim 15, wherein the resilient arrangement further comprises a second hollow member arranged to extend from the conduit, wherein the first hollow member is partially disposed within and coupled to the second hollow member.

23. A flow meter according to claim 22, wherein the second hollow member is resiliently deformable and configured to bend in response to fluid flow acting on the flow target.

24. A flow meter according to claim 22, wherein the second hollow member is arranged to extend outside the conduit.

25. A flow meter according to claim 22, wherein the second hollow member is coupled to the first hollow member at a position which in use is outside the conduit.

26. A flow meter according to claim 22, further comprising a spacer disposed between the first and second hollow members, wherein the first and second hollow members are connected to one another by the spacer.

27. A flow meter, comprising:
a conduit section configured to receive a fluid flow;
a flow target disposed within the conduit section;
a beam coupled to the flow target and extending to the outside of the conduit section;
a resilient arrangement attached between the beam and the conduit section and comprising:
- a resiliently deformable outer hollow member which is attached to the conduit section and which extends outwardly from the conduit section; and
- a resiliently deformable inner hollow member which is partially disposed within the outer hollow member and which is attached to the outer hollow member at a position outside of the conduit section, wherein the inner hollow member extends into the conduit section where it is attached to the beam and the flow target, and wherein the beam is partially disposed within the inner hollow member and extends from the inner hollow member to the outside of the conduit section;

wherein the conduit section is configured such that fluid flow in the conduit section acts on the flow target to cause the outer and inner hollow members to resiliently bend; and a non-contact inductive sensor comprising:
- a static sensor part;
- a moveable sensor part coupled to the beam at a position outside of the conduit section;
- wherein one of the static sensor part and the moveable sensor part comprises at least one primary coil and at least one secondary coil, and wherein the other of the static sensor part and the moveable sensor part comprises a conductor; and an alternating current supply connected to the at least one primary coil configured to supply alternating current to the at least one primary coil;

wherein the conduit section is configured such that fluid flow in the conduit section acts on the flow target to cause displacement of the moveable sensor part with respect to the static sensor part to induce an induced current in the secondary coil which is representative of the fluid flow rate in the conduit section.

\* \* \* \* \*